G. F. Foss,
Jar Lifter.
No. 77,182. Patented Apr. 28, 1868.
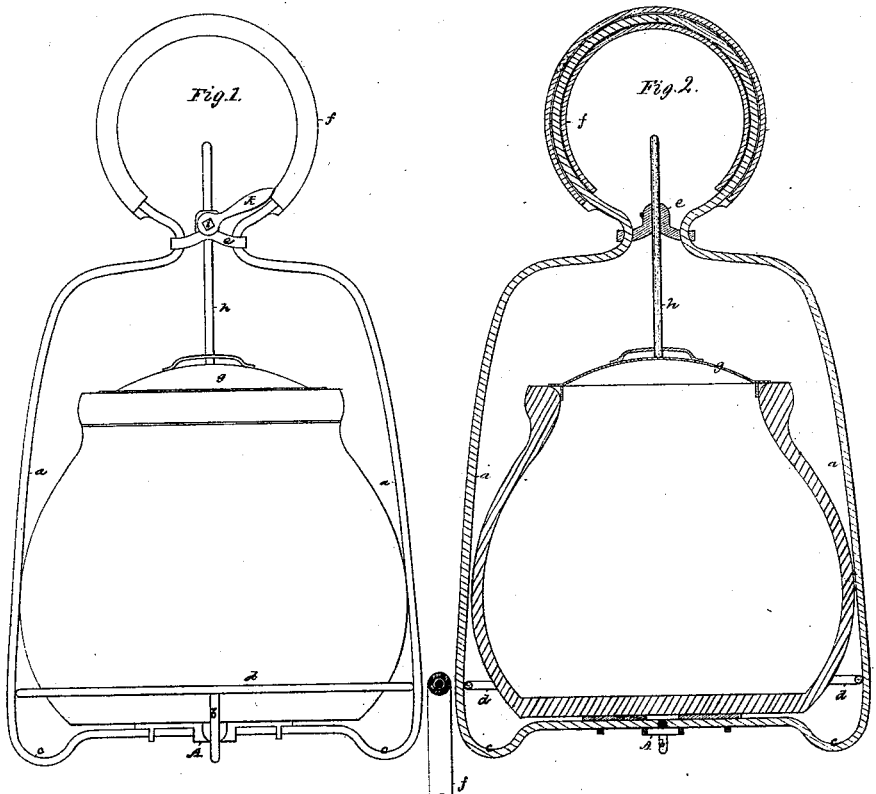
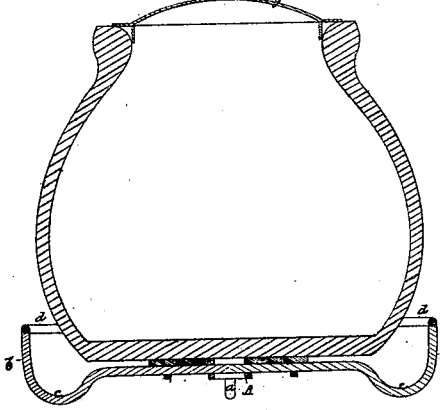
Witnesses
S. N. Piper
J. R. Snow
George F. Foss
by his attorney

United States Patent Office.

GEORGE F. FOSS, OF EAST BOSTON, MASSACHUSETTS, ASSIGNOR TO HIMSELF AND SAMUEL C. HOPKINS, OF SAME PLACE.

Letters Patent No. 77,182, dated April 28, 1868.

IMPROVED BEAN-POT LIFTER AND CARRIER.

The Schedule referred to in these Letters Patent and making part of the same.

TO ALL PERSONS TO WHOM THESE PRESENTS MAY COME:

Be it known that I, GEORGE F. FOSS, of East Boston, in the county of Suffolk, and State of Massachusetts, have invented a new and useful Bean-Pot Supporting-Frame or Carrier; and I do hereby declare the same to be fully described in the following specification, and represented in the accompanying drawings, of which—

Figure 1 is a front elevation, and

Figures 2 and 3 vertical sections of it and a bean-pot placed within it.

The purpose of my invention is to enable a person to readily support and carry a pot when containing beans, or a matter in a heated state.

In the drawings, A denotes a junction-piece or metallic cross, from the arms of which wires $a\ a$ and $b\ b$ project in directions at right angles with each other, each of the said wires being formed with a bend, as shown at $c$, just below its junction with an annulus or bottom-guard, $d$, which, arranged with the wires as represented, is fastened to them respectively.

The two longer wires, $a\ a$, which, in fact, are portions of one piece, extend upward and pass through a connection, $e$, formed as represented, after which they are bent in a circular form, so as to make an open handle, $f$.

From the cover $g$ of the bean-pot A, a rod, $h$, extends upward, and slides through the connection $e$, there being a set-screw, $i$, screwed laterally into such connection and against the rod, such screw being projected from a lever or arm, $k$.

By raising the cover, the pot may be removed from within the bottom-guard $d$, but when the pot is resting on the junction-piece, and is within the guard, and the cover is forced down upon the mouth of the pot, and the clamp-screw is set up, the pot will not only be covered, but will be fixed within the carrier, so that a person, by such, may easily transport it from one place to another by taking hold of the handle of the carrier.

I claim the bean-pot carrier, made substantially as described, that is, of the bottom-guard $d$, the wires $a$ and $b$, the cover $g$, the connection-piece $e$, and the clamp-screw $i$, arranged and combined as specified.

GEORGE F. FOSS.

Witnesses:
R. H. EDDY,
F. P. HALE, Jr.